(12) United States Patent  
Currie et al.

(10) Patent No.: US 7,020,971 B1  
(45) Date of Patent: Apr. 4, 2006

(54) COMPASS ORIENTATION COMPENSATION

(75) Inventors: John F. Currie, Canton, MI (US); Nathan Vincent Goslee, Ypsilanti, MI (US); Andrew John Driscoll, Farmington, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/942,205

(22) Filed: Sep. 16, 2004

(51) Int. Cl.  
*G01C 17/38* (2006.01)

(52) U.S. Cl. ...................................................... 33/356

(58) Field of Classification Search .............. 33/355 R, 33/356, 357, 358, 359  
See application file for complete search history.

(56) References Cited

U.S. PATENT DOCUMENTS

| 4,738,031 | A | | 4/1988 | Alberter et al. |
| 5,151,872 | A | * | 9/1992 | Suzuki et al. ................. 33/356 |
| 5,255,442 | A | * | 10/1993 | Schierbeek et al. ........... 33/361 |
| 5,946,813 | A | | 9/1999 | Nachbauer et al. |
| 6,047,237 | A | | 4/2000 | Michmerhuizen |
| 6,140,933 | A | * | 10/2000 | Bugno et al. ............. 33/355 R |
| 6,301,794 | B1 | * | 10/2001 | Parks et al. ................... 33/356 |
| 6,513,252 | B1 | * | 2/2003 | Schierbeek et al. ........... 33/356 |
| 2002/0083605 | A1 | * | 7/2002 | Blank et al. .................. 33/356 |
| 2003/0167121 | A1 | * | 9/2003 | Ockerse et al. ............... 33/357 |
| 2005/0091861 | A1 | * | 5/2005 | Parks et al. ................... 33/356 |

* cited by examiner

*Primary Examiner*—G. Bradley Bennett  
(74) *Attorney, Agent, or Firm*—Rader, Fishman & Grauer PLLC

(57) ABSTRACT

A compass system comprises an electronic compass capable of providing a raw compass reading, at least one adjustment factor relating to a position of the electronic compass, and a compensation device selectively providing a compensated compass reading based on the raw compass reading and the adjustment factor. Further, at least one adjustment factor relating to the position of the electronic compass is defined and may be stored in a memory.

25 Claims, 7 Drawing Sheets

COMPASS ORIENTATION COMPENSATION

BACKGROUND OF THE INVENTION

This invention relates to configuring an electronic compass for use regardless of the mounting orientation of the compass.

Modern vehicles include an ever-increasing number of devices that assist drivers and occupants (collectively "users") with the task of navigating the vehicle. For example, electronic compasses, such as digital compasses using a printed circuit board to determine a vehicle's compass heading, provide users with valuable navigation information as they operate their vehicles. Moreover, other devices within the vehicle can benefit from accessing the navigation information provided by a compass. For example, a Global Positioning System (GPS) navigation system might use compass information to augment the GPS information at low or stationary speeds where GPS-only systems experience reduced accuracy.

Despite the advantages provided by vehicle compasses, at present including a compass within a vehicle is often expensive. For example, due to space constraints and varying vehicle designs, the circuit board for the compass must be installed in different vehicles in a wide variety of different placements and orientations. In one type of vehicle, the circuit board may be installed in a right-side up manner, facing the front portion of the vehicle. In another type of vehicle, the circuit board could be installed in an upside-down manner, and at a substantial angle with respect to the front portion of the vehicle. Different placements and orientations of the circuit board need to be compensated for if the compass is to provide useful information to the occupants of the vehicle. Presently, however, the need to compensate for installation-specific attributes prevents the installation of a single compass in different vehicles with different installation configurations. Thus, at present, it is often expensive and inefficient for vehicle manufacturers and their suppliers to provide compasses in vehicles.

Accordingly, there is a need for a compass with the ability to compensate for different installation configurations in a vehicle. In particular, it would be desirable to be able to compensate compass output to allow a plurality of acceptable mounting placements and orientations for a single compass in a vehicle.

SUMMARY OF INVENTION

A compass system comprises an electronic compass capable of providing a raw compass reading, at least one adjustment factor relating to a position of the electronic compass, and a compensation device capable of providing a compensated compass reading based on the raw compass reading and the adjustment factor. Further, at least one adjustment factor relating to the position of the electronic compass is defined and may be stored in a memory. Some embodiments include a vehicle, wherein the electronic compass is located in the vehicle.

DETAILED DESCRIPTION

System Overview

Figure 1:
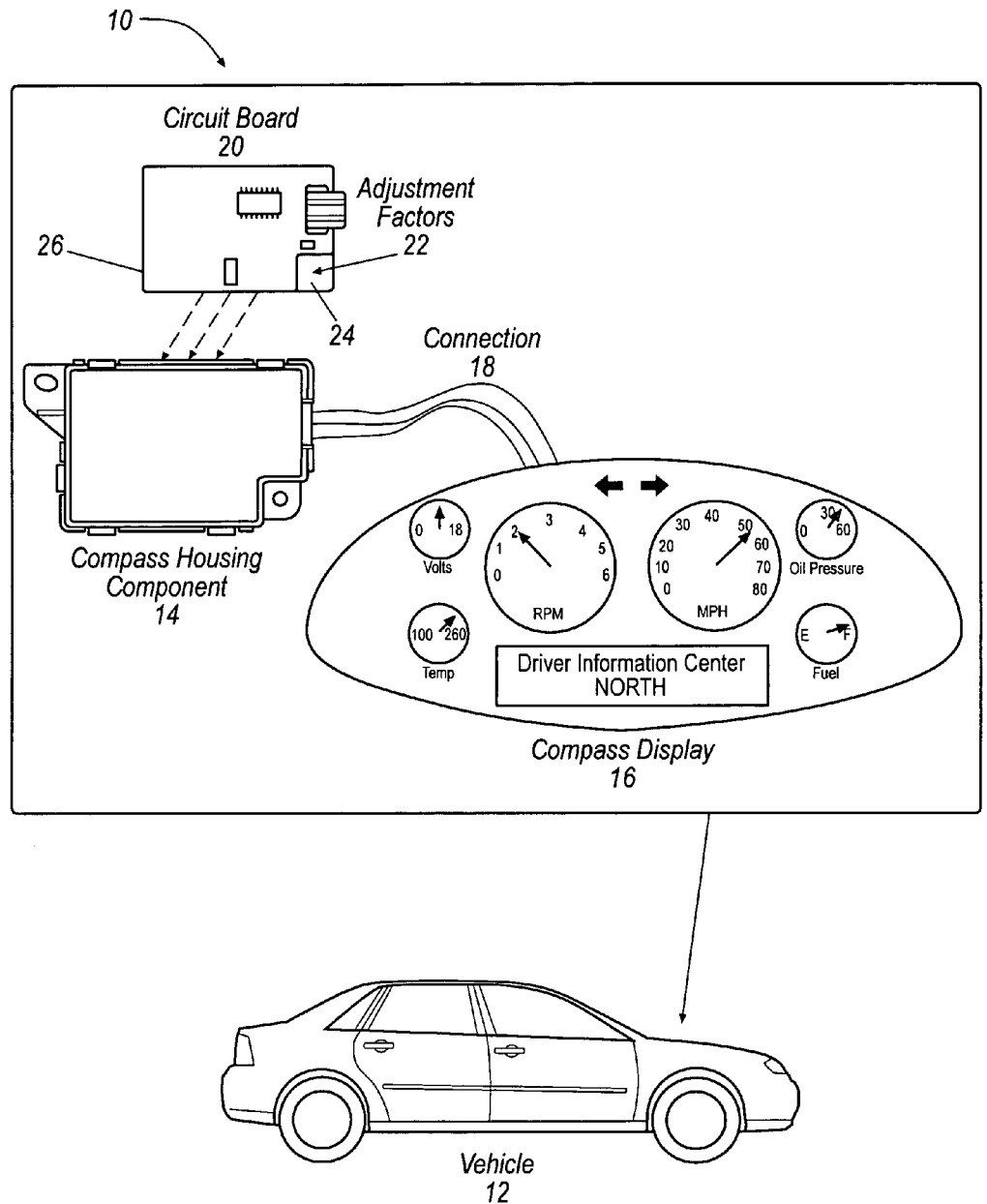
FIG. 1 is a schematic diagram illustrating an example of a compass system installed in a vehicle, according to an embodiment.

FIG. 1 is a schematic diagram illustrating an exemplary embodiment of a compass system 10 installed in a vehicle 12. The compass system 10 can be used in a variety of different vehicles 12. In many embodiments, vehicle 12 will be an automobile or a truck. However, vehicles 12 can also include airplanes, boats, helicopters, motorcycles, bicycles, hot air balloons, submarines, blimps, or any other apparatus used to move users from place to place. Further, those skilled in the art will recognize that compass system 10 will be functional and operation even if not placed within a vehicle 12, and thus that embodiments are possible in which compass system 10 is not in a vehicle 12.

The compass system 10 may include a compass housing 14 and a compass display 16, connected by connection 18. However, as discussed below, some or all of these components may be absent in some embodiments.

Compass housing 14 is an optional but preferred component that in some embodiments contains or partially contains a circuit board 20. Circuit board 20 comprises an electronic or digital compass such as will be known to those skilled in the art. The flexibility of connection 18, discussed below, allows vehicle designers to place compass housing 14 and/or circuit board 20 in a wide variety of placement locations, mounting orientations, and mounting angles.

Compass display 16 is used to display compass headings to a human user such as a vehicle operator. Those skilled in the art will understand that compass display 16 may include other driver information such as outside temperature, gas mileage information, trip miles, etc. For example, compass display 16 may be an overhead display or mirror compass display such as are known in the art. In some embodiments, compass display 16 is optional because the primary use for the navigation information from compass system 10 is for use by another device, and not a human user. However, in many embodiments, compass display 16 is included for access by a human user within vehicle 12. The compass display 16 can be located virtually anywhere within the interior of the vehicle 12. In some embodiments, compass display 16 is located in a vehicle's instrument panel. In some embodiments, compass display 16 is configured so that a user may from time to time move it to various locations within vehicle 12.

Further, some embodiments of compass system 10 include more than one compass display 16. A wide range of different compass displays 16 can be incorporated into the compass system 10. Different compass displays 16 may provide users with different opportunities to interact with the compass system 10. In some embodiments, compass display 16 may be associated with an input mechanism such as buttons, a touch screen, or other input device known to those of ordinary skill in the art, thereby allowing a user to reconfigure adjustment factors 22, discussed below.

As noted above, compass display 16 is attached to circuit board 20, or, in some embodiments, housing component 14, by a connection 18. Connection 18 can be any kind of connection as will be known to those skilled in the art, including a wired connection, a wireless connection, or a combination of both wired and wireless technologies. In some embodiments compass display 16 and/or circuit board 20 include a serial port for connection to a communications bus in vehicle 12, and connection 18 includes the communications bus. Use of a communications bus in vehicle 12 as well as other various types of wired and wireless connections will be known to those skilled in the art. In embodiments in which compass system 10 is intended for use in a vehicle 12, connection 18 provides vehicle designers with the flexibility of placing the housing 14 and/or circuit board 20 at virtually any location within the vehicle 12.

Circuit board 20, i.e., an electronic compass, determines directional information, for example, compass headings that may be shown on compass display 16. As noted above, circuit board 20 is in some embodiments at least partially covered by compass housing 14.

Circuit board 20 in many embodiments includes a memory 24 for storing information necessary to compensate for the placement, orientation, and/or installation angle within a vehicle 12. In some embodiments, as discussed in more detail below, circuit board 20 includes a compensation device such as processor 26 that uses adjustment factors 22 to compensate for the orientation of circuit board 20. In other embodiments (not shown) memory 24 and/or processor 26 are located separately from circuit board 20. For example, in the embodiments discussed above in which connection 18 is a communications bus in vehicle 12, those skilled in the art will understand that memory 24 and processor 26 could be located in or associated with a variety of different components of vehicle 12. In general, those skilled in the art will recognize that the location of memory 24 and processor 26 are not critical to the operation of compass system 10.

Adjustment Factors

Broadly speaking, adjustment factors 22 relate to the position of circuit board 20 relative to a predefined coordinate system and/or other objects. Adjustment factors 22 may include any information that is potentially relevant to the process of compensating for the orientation and/or location of a compass. In many embodiments, multiple adjustment factors 22 are used to determine the necessary adjustment to a compass reading provided by compass system 10. Examples of adjustment factors 22 and their use in determining the necessary adjustment to a compass reading provided by compass system 10 are provided below. In general, adjustment factors 22 may include, but are by no means limited to, one or more of the following: proximity to other devices, yaw angle, roll angle and/or pitch angle.

Those skilled in the art will recognize that proximity to particular types of devices is important if, for example, a particular component or device near circuit board 20 may disrupt, interfere with, or render less accurate the compass reading. In some embodiments, proximity to such devices can be adjusted for using heuristics that are known in the art, with the appropriate adjustment factor 22 being stored in the memory 24.

Those skilled in the art will recognize that other adjustment factors 22 besides those described herein are possible and within the scope and spirit of the present invention. Accordingly, a novel feature of the invention is that different positions or orientations of circuit board 20 can be adjusted for with the appropriate adjustment factors 22.

Process Flows

Figure 2A:
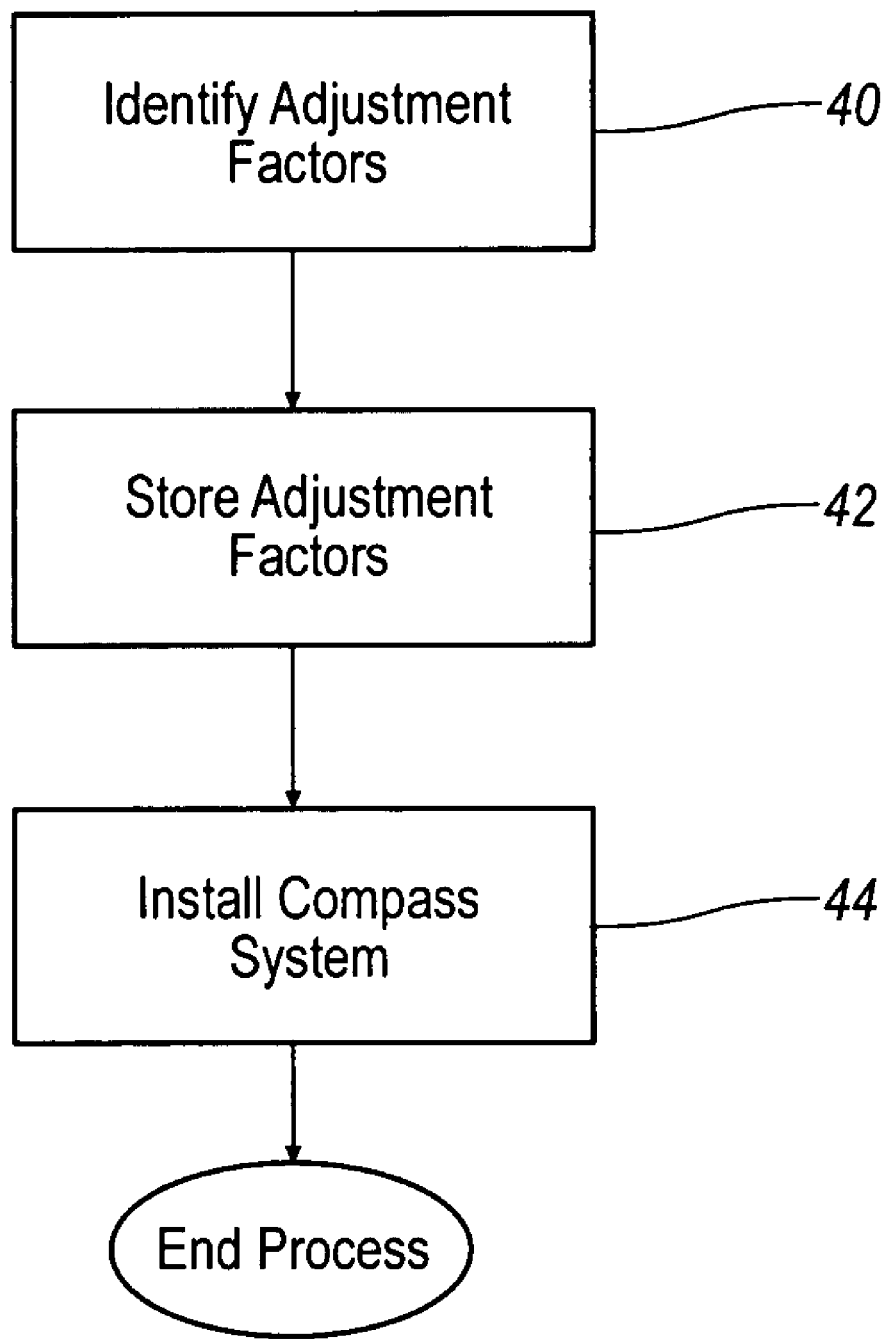
FIGS. 2A and 2B are process flow diagrams illustrating processes for identifying, storing, and using adjustment factors relating to the position of an electronic compass, according to an embodiment.

FIG. 2A is a process flow diagram illustrating a process for identifying and storing information relating to the installation of the circuit board 20 for the compass apparatus, i.e., adjustment factors 22. Those skilled in the art will recognize that the below-described steps 40–44 could be performed in any order without departing from the scope of the invention.

At step 40, adjustment factors 22 are identified. Any factor possibly relevant as an adjustment factor (which can also be referred to as a configuration factor) should be considered at this step. For example, in some embodiments, it will be known that circuit board 20 is or will be installed in vehicle 12 at a certain yaw angle and at a certain roll angle. It may also be known that circuit board 20 is or will be installed near a device that will affect a compass reading in a certain way. Accordingly, these factors, and possibly others, should be identified in this step.

At step 42, adjustment factors 22 are stored within memory 24. In embodiments in which compass system 10 is installed in a vehicle 12, the storage of adjustment factors 22 may occur before or after compass system 10 is installed in vehicle 12. Further, as noted above, some embodiments provide for user input that changes or provides new adjustment factors 22 while compass system 10 is in use.

At step 44, circuit board 20 and other components of the compass are deployed. Such deployments in many embodiments constitute installation in vehicle 12.

Figure 2B:
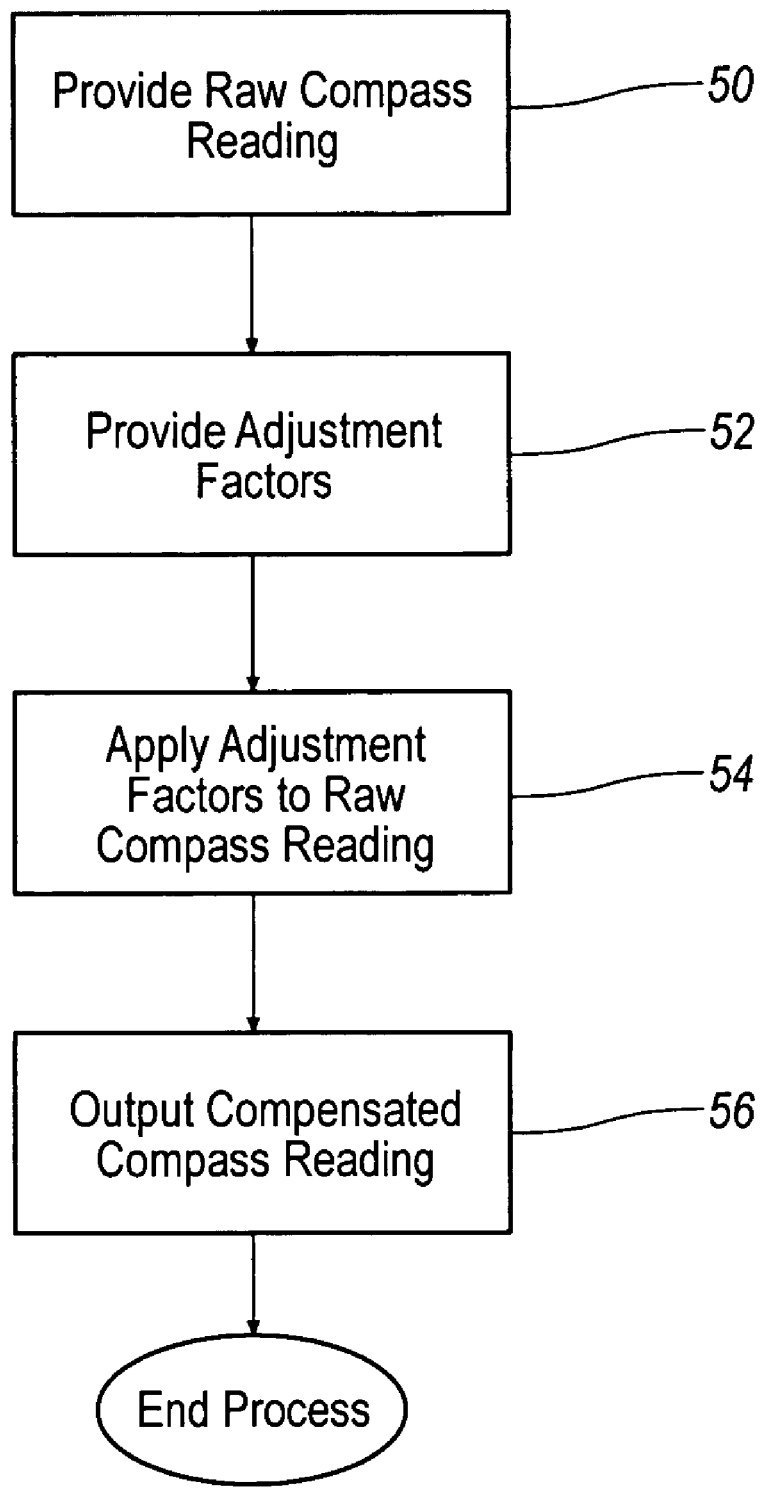

FIG. 2B describes the process by which adjustment factors 22 are used to compensate the output of compass system 10.

At step 50, circuit board 20 provides a compass reading to processor 26. The compass reading provided in this step may be referred to as a "raw" compass reading inasmuch as it has not yet been adjusted to compensate for the placement and/or orientation of circuit board 20. That is, adjustment factors 22 have not yet been taken into account.

At step 52, memory 24 provides adjustment factors 22 to processor 26.

At step 54, processor 26 performs a compensation heuristic that applies adjustment factors 22 to the raw compass reading provided in step 50, thereby providing a compensated compass reading.

At step 56, circuit board 20 outputs the compensated compass reading provided in step 54 to compass display 16 or to some other device, e.g., some other device in vehicle 12, as described above.

Exemplary use of Adjustment Factors

It should be understood that the following description of adjustment factors is exemplary and not restrictive. The following description explains adjustment factors that have been practiced in certain embodiments, but numerous other adjustment factors are possible within the scope and spirit of the present invention.

FIGS. 3–6 represent a particular illustrative embodiment that employs two adjustment factors 22 that are well known to those skilled in the art: "Yaw" and "Roll". Yaw represents the rotation of the circuit board 20 about the vertical axis of the vehicle (i.e., the angular difference in alignment between the circuit board 20 and the vehicle 12 in the horizontal plane), and roll represents rotation of the circuit board 20 about the long axis of the vehicle (i.e., the angular difference in alignment between the circuit board 20 and the vehicle 12 in the vertical plane). In some embodiments, a third adjustment factor, "Pitch", also well known to those skilled in the art, may be used to completely describe any orientation of the circuit board 20 in three dimensional space. In the present illustration, orientation of circuit board 20 is assumed to be restricted such that pitch remains a constant of zero degrees. Further, for ease of illustration, in the particular embodiment with respect to which an exemplary use of adjustment factors 22 is discussed herein, roll is restricted to two values: "0 degrees", representing a right-side up orientation of circuit board 20; and "180 degrees", representing an upside-down orientation of circuit board 20.

In one embodiment, "Compass_Mounting" represents the combination of adjustment factors such that Compass_Mounting is the set of adjustment factors [Yaw, Roll]. There are various ways to apply adjustment factors to a raw compass reading to obtain a compensated compass reading. Table 1 provides an example heuristic for the case in which pitch is zero degrees and roll is constrained to zero or one-hundred-and-eighty degrees.

TABLE 1

Let Raw_Angle equal a raw compass reading in degrees, and let Compensated_Angle equal a compensated compass reading in degrees.
Then:
If Roll = 180 degrees, then
    Compensated_Angle =
      [(360 − Raw Angle) − Yaw + 360] modulo 360;
Else
    Compensated_Angle = (Raw_Angle − Yaw + 360) modulo 360.

By using this heuristic with appropriate adjustment factor values for each specific compass circuit board 20 mounting orientation, the compensated compass reading becomes independent of the mounting orientation of circuit board 20. Accordingly, compass system 10 may use Compass_Mounting information to compensate for a wide variety of different circuit board mounting situations, which advantageously provides flexibility to utilize the same compass circuit board 20 and/or housing 14 in different vehicles 12 having different compass mounting requirements.

In some embodiments, adjustment factors like Compass_Mounting information are provided directly on the circuit board 20 in memory 24 for use in compensating for specific mounting orientations and angles. In other embodiments, Compass_Mounting information may be provided to circuit board 20 from an external source, e.g., memory 24 located somewhere in a vehicle 12 and connected to a connection 18, to compensate for the output from circuit board 20, this compensation being performed either by a processor 26 on circuit board 20 or by processor 26 at some other location.

A communication message may provide adjustment factors 22, e.g., Compass_Mounting information, to circuit board 20 where it is used to compensate compass headings according to a heuristic such as the exemplary heuristic illustrated above in Table 1. Those skilled in the art will recognize that this communication message may take a variety of formats so long as the adjustment factor or factors 22 are adequately conveyed to circuit board 20. For example, in some embodiments, circuit board 20 receives a 2 byte message conveying Compass_Mounting information. The low order 9 bits may convey the Yaw angle; and, since the Roll angle is restricted to two values in this embodiment, the 10th bit may convey the Roll angle.

Figure 3:
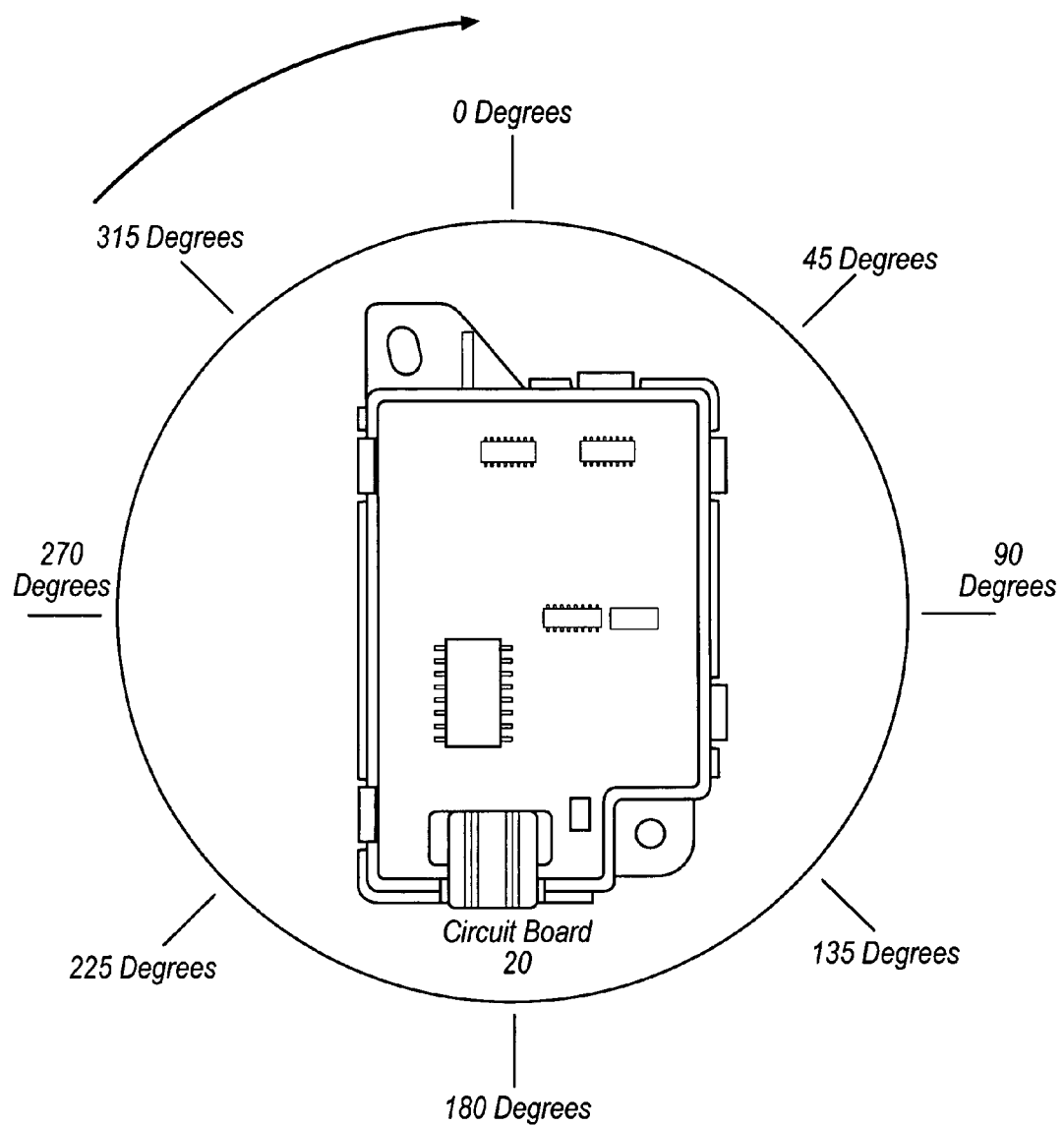
FIG. 3 is a diagram illustrating default adjustment factors, according to an embodiment.

Turning now to FIG. 3, one set of possible default settings for compass system 10 is shown. Specifically, FIG. 3 depicts that the default Yaw of circuit board 20 is 0 degrees and the default Roll of circuit board 20 is 0 degrees.

Figure 4:
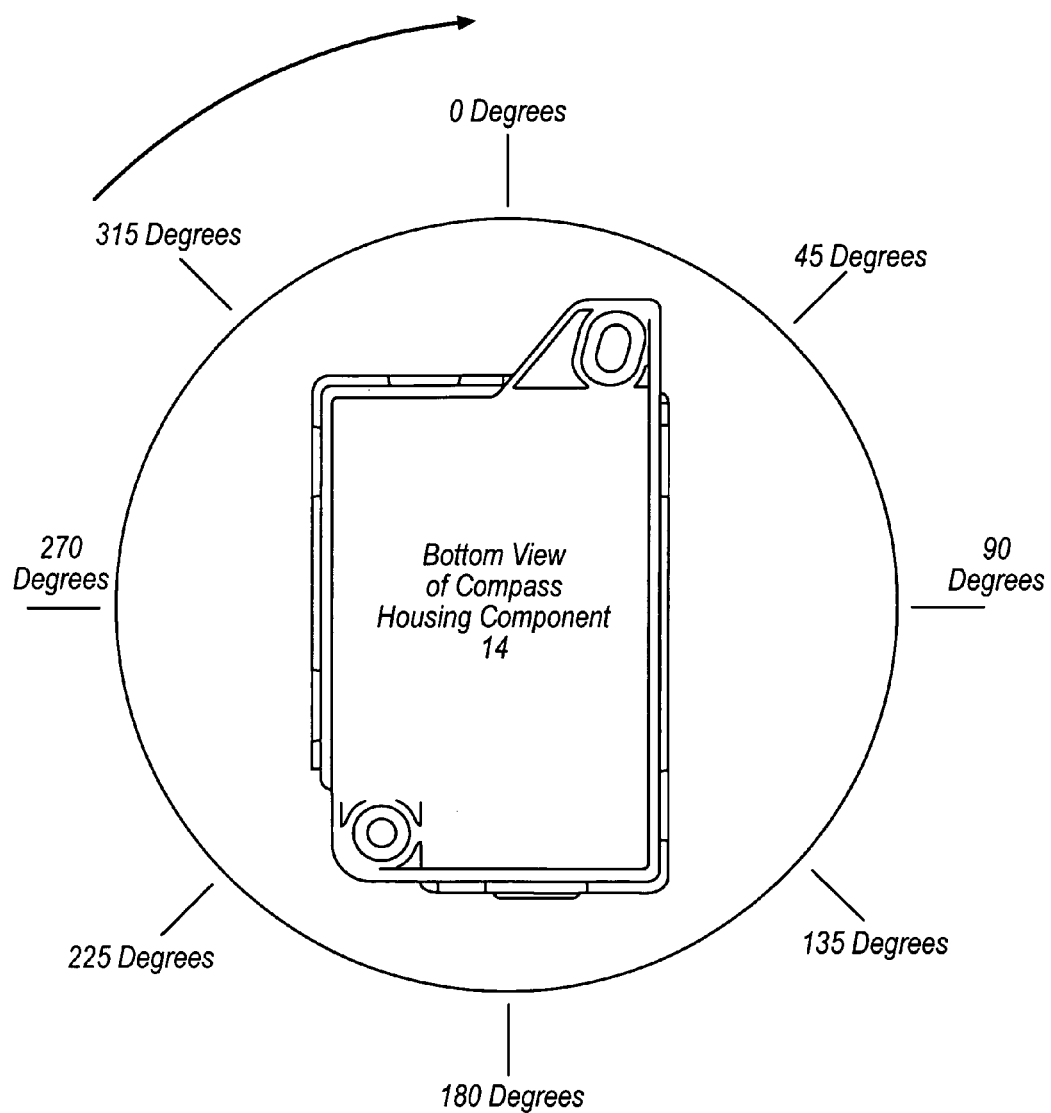
FIG. 4 is a diagram illustrating an upside-down circuit board 20 mounted at the default yaw angle, according to an embodiment.
Figure 5:
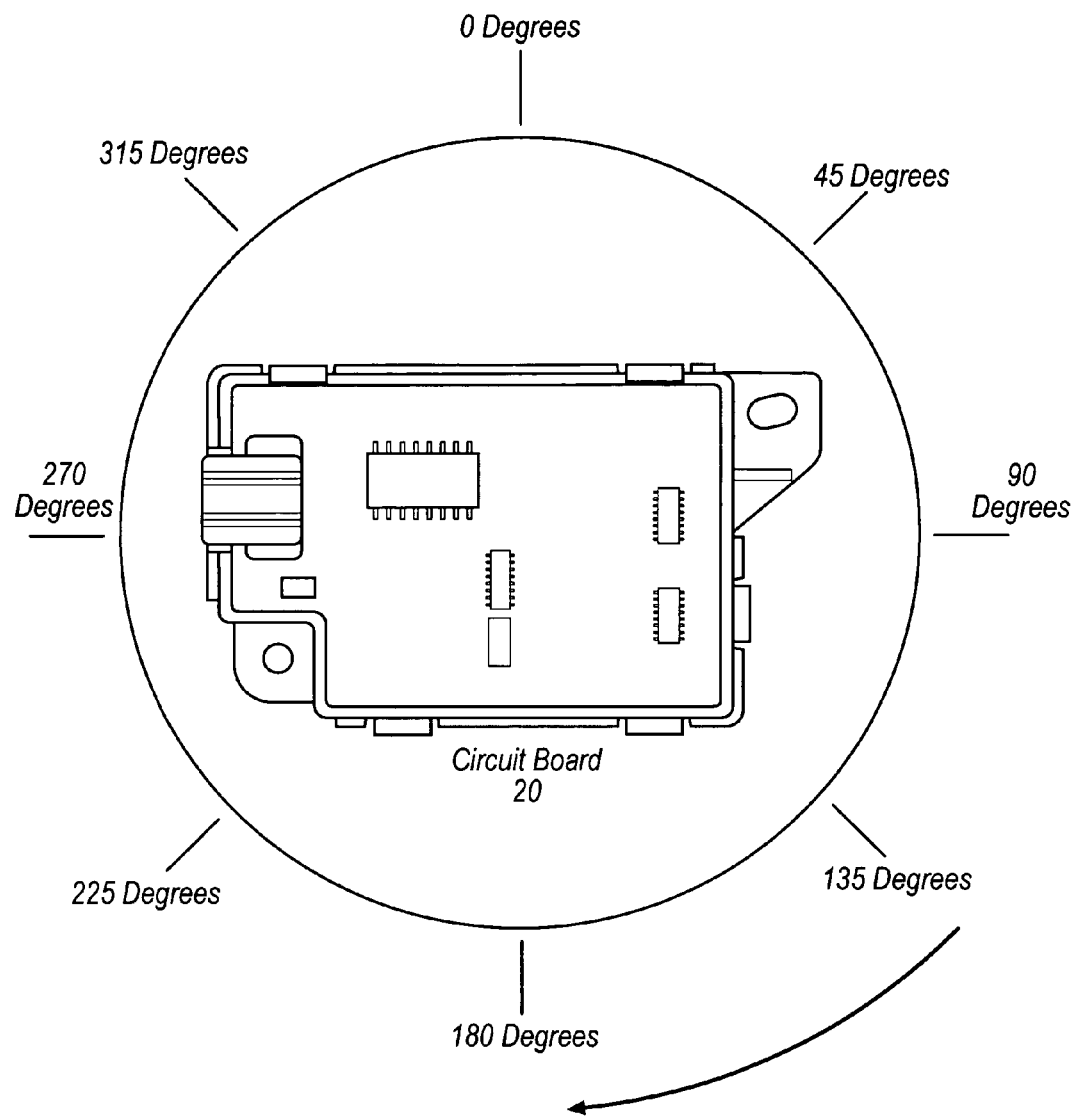
FIG. 5 is a diagram illustrating a right-side up circuit board mounted at a 90 degree yaw angle, according to an embodiment.
Figure 6:
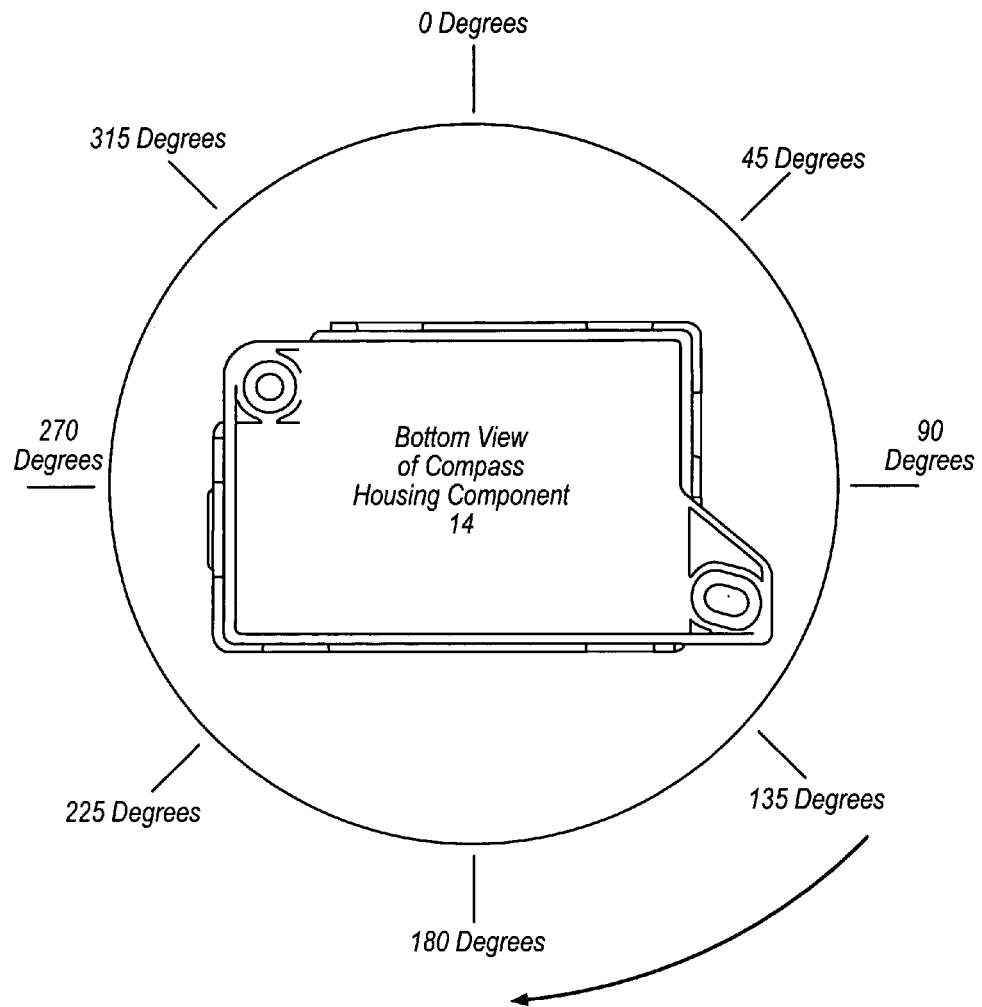
FIG. 6 is a diagram illustrating an upside-down circuit board mounted at a 90 degree yaw angle, according to an embodiment.

FIGS. 4–6 provide further examples of installation configurations for circuit board 20.

FIG. 4 is a diagram illustrating an upside-down circuit board 20 mounted at the default yaw angle. In this position, compass housing 14 and circuit board 20 are oriented so that the housing is upside down with the connector to connection 18 facing the rear of the vehicle. Then the Compass_Mounting information would be [0, 180]; where Yaw is 0 degrees, and Roll is 180 degrees.

FIG. 5 is a diagram illustrating a right-side up circuit board 20 mounted at a 90 degree yaw angle. In this position, the compass housing 14 is oriented so that the housing is right-side up with the connector facing the driver side of the vehicle. Then the Compass_Mounting information would be [90, 0]; where Yaw is 90 degrees, and Roll is 0 degrees.

FIG. 6 is a diagram illustrating an upside-down circuit board 20 mounted at a 90 degree yaw angle. In this position, the compass housing 14 is oriented so that the housing is upside-down with the connector facing the driver's side of the vehicle. Then the Compass_Mounting information would be [90, 180]; where Yaw is 90 degrees, and Roll is 180 degrees.

Alternative Embodiments

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in compass systems and methods, and that the invention will be incorporated into such future embodiments.

We claim:

1. A compass system, comprising:
an electronic compass installed in a vehicle in at least one known angle with respect to at least one plane in the vehicle, the compass being capable of providing a raw compass reading;
at least one adjustment factor relating to a position of the electronic compass the at least one adjustment factor including the at least one known angle; and
a compensation device selectively providing a compensated compass reading based on the raw compass reading and the adjustment factor.

2. The compass system of claim 1, wherein the at least one adjustment factor includes proximity to another device.

3. The compass system of claim 1, wherein the at least one adjustment factor is a plurality of adjustment factors.

4. The compass system of claim 1, wherein the at least one adjustment factor includes at least one of a yaw angle, a pitch angle, and a roll angle.

5. The compass system of claim 1, further comprising a display connected to the electronic compass, wherein the display is capable of displaying the compensated compass reading.

6. The compass system of claim 1, further comprising a housing, wherein the electronic compass is disposed within the housing.

7. The compass system of claim 1, wherein the compensation device is included within the electronic compass.

8. The compass system of claim 1, wherein the compensation device is not included within the electronic compass.

9. The compass system of claim 1, further comprising a memory that stores the at least one adjustment factor and provides the at least one adjustment factor to the compensation device.

10. The compass system of claim 1, wherein the memory is included within the electronic compass.

11. The compass system of claim 1, wherein the memory is not included within the electronic compass.

12. A method for compensating for the position of an electronic compass, comprising:
   installing the electronic compass in a vehicle in at least one known angle with respect to at least one plane in the vehicle;
   defining at least one adjustment factor that includes the at least one known angle; and
   storing the at least one adjustment factor in a memory.

13. The method of claim 12, further comprising providing a compensated compass reading based on the at least one adjustment factor and a raw compass reading provided by the electronic compass.

14. The method of claim 12, wherein the at least one adjustment factor is a plurality of adjustment factors.

15. The method of claim 12, wherein the at least one adjustment factor includes at least one of a yaw angle, a pitch angle, a roll angle, and proximity to another device.

16. The method of claim 13, further comprising connecting a display to the electronic compass, wherein the display is capable of displaying the compensated compass reading.

17. The method of claim 13, wherein the compensated compass reading is provided by a compensation device that is not included in the electronic compass.

18. The method of claim 12, further comprising a housing, wherein the electronic compass is disposed within the housing.

19. The method of claim 13, wherein the electronic compass includes a compensation device that is used to provide the compensated compass reading.

20. The method of claim 19, further comprising the memory providing the at least one adjustment factor to the compensation device.

21. The method of claim 20, wherein the memory is included within the electronic compass.

22. The method of claim 20, wherein the memory is not included within the electronic compass.

23. A compass system, comprising
   electronic compass means for providing a raw compass reading;
   a circuit board associated with the compass means for processing the compass reading the circuit board being installed in the vehicle in a certain orientation, the circuit board including memory means for storing an adjustment factor, and compensating means for adjusting the raw compass reading according to the stored adjustment factors to provide a compensated compass reading;
   wherein the adjustment factors include the angular difference in alignment between the circuit board and the vehicle in a horizontal plane and the angular difference in alignment between the circuit board and the vehicle in a vertical plane.

24. The compass system of claim 23, wherein the adjustment factors include at least one of a yaw angle, a pitch angle, and a roll angle.

25. The compass system of claim 23, wherein the adjustment factors include proximity to another device.

* * * * *